Patented Dec. 26, 1950

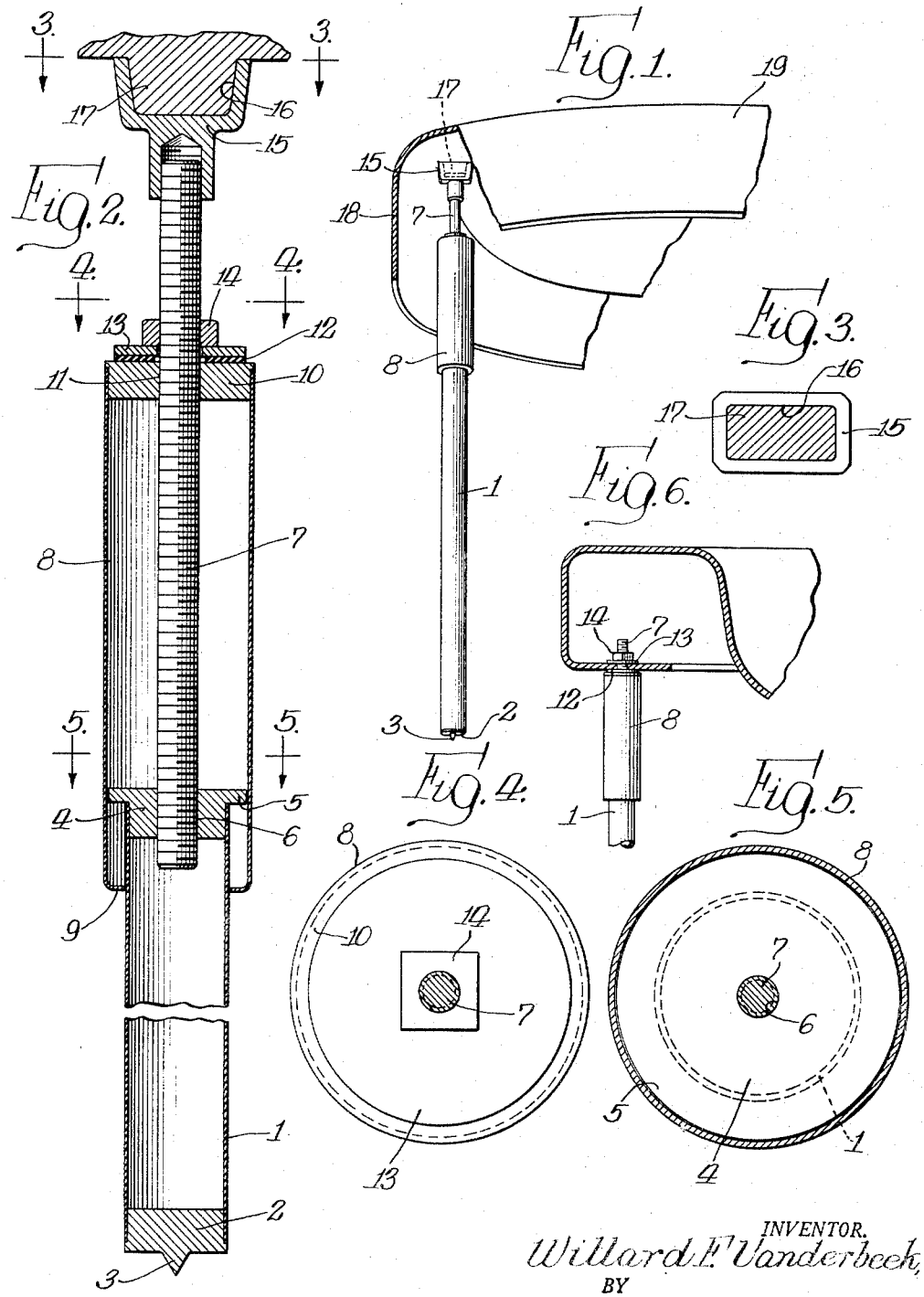

2,535,613

UNITED STATES PATENT OFFICE 2,535,613

LAVATORY LEG ASSEMBLY

Willard Fredrick Vanderbeek, Sycamore, Ill., assignor to Turner Brass Works, Sycamore, Ill., a corporation of Illinois Application August 15, 1946, Serial No. 690,788

6 Claims. (Cl. 45—139)

This invention relates to a leg assembly for lavatories and the like, and more particularly to a leg assembly for supporting wash bowls, basins, sinks, enameled plumbing ware, and such other articles to which it may be adapted.

Any desired number of such leg assemblies may be used as desired. When used in connection with a basin or other receptacle supported by a bracket from a wall, two of such leg assemblies will be sufficient for supporting the front thereof; or if such wall brackets are not used, four or any other desired number of such leg assemblies may be availed of.

Among the objects of my invention are: to provide a novel and improved leg assembly; to provide a leg assembly having a novel arrangement of parts, and possessing strength, ease of assembly and disassembly, height adjustment, pleasing appearance and durability; to provide a leg assembly capable of manufacture largely from metal of standard shapes and screw machine products; and to provide a lavatory leg assembly capable of easy and quick application behind the marginal flange of a lavatory bowl and the like, and at the same time having parts readily accessible for height adjustment.

Other objects and advantages will become readily apparent from the following detailed description taken in connection with the accompanying drawings, wherein:

Fig. 1 is a fragmentary perspective view of a lavatory bowl or the like supported by a leg assembly embodying my invention.

Fig. 2 is a vertical longitudinal central section through a leg assembly embodying my invention, and fragmentarily showing the adjacent portion of the supported article.

Fig. 3 is an enlarged horizontal transverse section on the line 3—3 of Fig. 2.

Fig. 4 is an enlarged section on the line 4—4 of Fig. 2.

Fig. 5 is an enlarged transverse section on the line 5—5 of Fig. 2.

Fig. 6 is a fragmentary vertical section showing a modified form of connection between the leg and a different type of bowl.

While my invention further resides in the combination, construction and arrangement of parts illustrated in the accompanying drawings, I have shown therein for illustrative purposes only, a preferred embodiment, and wish it understood that the same is susceptible of modification and change without departing from the spirit and scope of the appended claims.

In the form shown for illustrative purposes in the drawings, my leg assembly comprises a hollow tube 1 having a metal plug 2, inserted with a press or other tight fit into the lower end thereof, the plug 2 preferably having a central downwardly extending pointed projection 3 for engagement with the floor or other supporting surface. In the top end of the tube 1, and extending thereinto with a press or other form of tight fit, is a bushing 4 having an annular marginal flange 5 and a threaded opening 6 for receiving the threaded stud or rod 7.

Positioned around the bushing 4 and its annular flange 5 is a sleeve 8 having at its bottom end an inwardly extending flange 9 with its inner edge close to but slidable on the exterior of the tube 1. Fixed by a press fit or otherwise as desired, in the upper end of sleeve 8 is a bushing 10 having a central screw threaded opening 11 threadably receiving the threads of the stud or rod 7. Positioned upon the upper surface of bushing 10 is a rubber washer 12, and positioned above this washer to contact the same is a metal washer 13. Threadably mounted upon the stud or rod 7 is a nut 14 which, when desired, may be screwed downwardly to grip the washers 12 and 13 between this nut and the bushing 10.

Threaded upon the upper end of the stud or rod 7 is a cup-shaped member 15. The depression in the cup-shaped member 15 is preferably non-circular as shown at 16 in Fig. 3, to removably receive a similarly shaped lug 17 fixed integrally or otherwise to the under surface of the adjacent portion of the lavatory bowl or other article being supported as shown in Fig. 1, this connection between the cup-shaped member 15 and the lug 17 occurring preferably behind the marginal flange 18 of the lavatory bowl or other receptacle being supported. The lavatory bowl or other device being supported is indicated at 19 in Fig. 1.

In operation the lavatory bowl or other article being supported may be supported by the leg assembly described herein either by rotating the stud or rod 7 or the tube 1, which relative rotation will either elevate or lower the cup-shaped member 15, depending upon the direction of rotation between these parts. As will be understood, the annular flange 5 of the bushing 4 is slightly smaller than the interior diameter of the sleeve 8 so as to permit relative rotation between these parts when desired for rotating either the rod 7 or the tube 1. When the rod 7 has been elevated as described above to such height as to have the bowl lug 17 properly seated in the cup-shaped member 15, the sleeve 8 will be rotated to cause rotation of the bushing 10 on the threads of rod 7 in such direction as to elevate or lower, as the case may be, the position of sleeve 8 to position its upper end behind the bowl flange 18. As will be understood, this rotation of sleeve 8 will cause its bottom flange 9 to move toward or away from the annular flange 5 or bushing 4, depending upon the direction of rotation. This provides for a sufficient amount of play between the flanges 5 and 9 to permit said adjustment. After the sleeve 8 has been adjusted to the desired position, nut 14 will be tightened to maintain the sleeve in its adjusted position.

This invention permits the use of straight pieces of tubing for the tubular leg 1, and also straight tubing of a somewhat larger diameter for the sleeve 8 which will have its lower end provided with the flange 9, and straight screw machine parts for the bushings 4 and 10, the plug 2, and the threaded rod 7, and a casting for the cup-shaped member 15. This affords a very simple, inexpensive and durable construction, economical to manufacture, durable in use and efficient and easily manipulated in operation.

While I have shown and described the cup-shaped member 15 seated over the lug 17 behind the bowl flange 18, it is to be understood that this leg assembly is adaptable for use in supporting other types of bowls or other articles to be supported either with or without the marginal flange 18, and with or without utilizing the lug 17. In Fig. 6 I have shown the application of my lavatory leg to a different type of bowl in which the lug 17 is omitted. In the form shown in Fig. 6 the cup-shaped member 15 is not required as the upper end of the threaded rod 7 is passed through a hole in the horizontal lower flange of the bowl edge, which horizontal flange on its bottom face contacts the rubber washer 12, and the metal washer 13 is positioned on the upper surface of said horizontal flange. The nut 14 is tightened against washer 13 to clamp these parts together.

I claim:

1. A leg assembly comprising, a tubular leg member having fixed to its upper end a bushing formed with a threaded opening, a threaded rod threadably mounted in said bushing, a sleeve of larger diameter than said tubular leg member and having fixed in its upper end a bushing threadably mounted on said rod above the bushing in the tubular leg member, whereby the leg assembly may be adjusted by rotating the rod, the tubular leg member and the sleeve with relation to each other, said sleeve being adjustable longitudinally with relation to said rod.

2. A lavatory leg assembly comprising, a tubular leg member having fixed to its upper end a bushing formed with a threaded opening, a threaded rod threadably mounted in said bushing, a sleeve longitudinally and rotatably movable on said tubular leg member and having fixed to its upper end a bushing formed with a threaded opening threadably receiving the threaded rod and movable longitudinally therealong, a supporting head on said rod, and a nut on the rod for locking the sleeve against rotation with relation to the rod.

3. A lavatory leg assembly comprising, a metal tubular leg member having fixed in its bottom end a metal plug formed with a pointed projection and fixed in its upper end a bushing having a threaded opening and an outwardly extending annular flange, a metal threaded rod threadably mounted in said bushing, a metal sleeve of larger diameter than the tubular leg member and having fixed in its upper end a bushing having a threaded opening and having formed on its bottom end an inwardly extending flange positioned below said annular flange, said tubular leg member bushing flange being rotatable and longitudinally movable within the sleeve and said sleeve flange having a central opening of smaller diameter than the leg bushing flange and being rotatable and longitudinally movable on the tubular leg member, said rod being threadably mounted in the sleeve bushing and having on its top end a cup-shaped member adapted to receive a complemental projection on the under surface of the lavatory, a washer above the sleeve bushing, and a nut threaded on the rod above the washer for clamping the washer between the nut and the sleeve bushing.

4. A lavatory leg assembly comprising, a metal tubular leg member having fixed in its bottom end a metal plug formed with a centrally located downwardly extending projection of smaller diameter than the leg member, said tubular leg member having in its upper end an inwardly extending portion formed with a central longitudinally extending threaded opening, a metal threaded rod threadably mounted in said threaded opening, a metal sleeve having an open bottom adapted to slide longitudinally over the outside of the tubular leg and a closed top formed with a central longitudinally extending threaded opening adapted to receive threads on the threaded rod, said threaded rod having a threaded portion extending upwardly beyond the closed top of the sleeve for supporting a lavatory on the threaded rod and tubular leg member with the bottom end of the sleeve below the top end of the tubular leg member, a washer on said closed top of the sleeve, and a nut threadably movable on the threaded rod above said washer for clamping the washer against said closed top of the sleeve.

5. A lavatory leg assembly comprising, a metal tubular leg member having fixed in its bottom end a metal plug formed with a centrally located downwardly extending projection of smaller diameter than the leg member, said tubular leg member having fixed in its upper end an inwardly extending portion formed with a central longitudinally extending threaded opening, a metal threaded rod threadably mounted in said leg threaded opening, a metal sleeve having an open bottom slidable longitudinally over the outside of the tubular leg and a closed top formed with a central longitudinally extended threaded opening within which said threaded rod is threadably movable in a longitudinal direction, said threaded rod extending upwardly beyond the top of the sleeve, a washer on the top of the sleeve, a nut threadably mounted on said rod above said washer, and a lavatory contacting member rotatably mounted on the upper end portion of the rod, whereby the rod is longitudinally adjustable in the leg member, and the sleeve is longitudinally adjustable on the rod and with relation thereto.

6. A lavatory leg assembly comprising, a metal tubular leg member having fixed in its bottom end a metal plug formed with a projection and having fixed in its upper end a bushing having a threaded opening, a metal threaded rod threadably mounted in said leg bushing, a metal sleeve of larger diameter than the tubular leg member and having fixed in its upper end a bushing having a threaded opening, said tubular leg member being rotatable and longitudinally movable within the sleeve and said sleeve being rotatable and longitudinally movable over the tubular leg member, said rod being threadably mounted in the sleeve bushing and having on its top end portion a cup-shaped member adapted to coact with the under surface of a lavatory, a washer above the sleeve bushing, and a nut threaded on the rod above the washer for clamping the washer between the nut and the sleeve bushing.

WILLARD FREDRICK VANDERBEEK.

REFERENCES CITED

The following references are of record in the file of this patent:

UNITED STATES PATENTS

| Number | Name | Date |
|---|---|---|
| 969,002 | Teachout | Aug. 30, 1910 |
| 1,806,169 | Kohler | May 19, 1931 |
| 2,247,235 | Hause | June 24, 1941 |

FOREIGN PATENTS

| Number | Country | Date |
|---|---|---|
| 8,552 | Great Britain | Apr. 4, 1914 |
| 35,164 | Austria | Nov. 10, 1908 |
| 165,746 | Switzerland | Feb. 16, 1934 |